OR 3,187,307 [redacted] [redacted] 230

(1)

June 1, 1965 K. JONES 3,187,307

REMOTE INDICATION SYSTEM

Filed May 9, 1960 2 Sheets-Sheet 1

INVENTOR
KENNETH JONES
BY Kane and Nydick
ATTORNEYS

June 1, 1965 K. JONES 3,187,307

REMOTE INDICATION SYSTEM

Filed May 9, 1960 2 Sheets-Sheet 2

INVENTOR
KENNETH JONES
By Haane and Nydick
ATTORNEYS

United States Patent Office 3,187,307
Patented June 1, 1965

3,187,307
REMOTE INDICATION SYSTEM

Kenneth Jones, Loudwater, England, assignor of one-half to Attwood Statistics Limited, London, England, a British company Filed May 9, 1960, Ser. No. 27,642
Claims priority, application Great Britain, Feb. 22, 1960, 6,140/60
11 Claims. (Cl. 340—147)

This invention relates to systems of remote indication and more particularly to systems for indicating at a central point the state of apparatus such as radio and television broadcast receiving sets located at a plurality of points remote from such central point. Such a system is described in my co-pending application Serial No. 823,519, filed June 29, 1959, now Patent No. 3,093,795, and the present invention constitutes an improvement or modification of a part of that system.

The said co-pending application is directed to a remote indication system comprising a central station and a plurality of responder stations remote from said central station and connected thereto over at least one communication path, means at the central station for repeatedly transmitting over said communication path a series of interrogation pulses, the responder at each said responder station being adapted to respond to a different one of said series of pulses and to return over said path at least one response pulse indicative of the state of apparatus at said responder station. The specific embodiments particularly described by way of example, comprise responders in which one or more electromagnetic relays are actuated on receipt of interrogation pulses in order to produce or route the response pulses. Such relays are prone to mechanical faults and are noisy in operation, or may become so during use.

One object of the present invention is to provide a responder in which, after initial setting, the response pulses are generated or routed electronically and without the use of electromagnetic relays. A further object of the invention is to provide a responder which enables a greater amount of information to be conveyed to the central station than is possible with the responders described in the co-pending application.

The invention will now be described with reference to the accompanying drawings, in which.

Figures 1, 2:
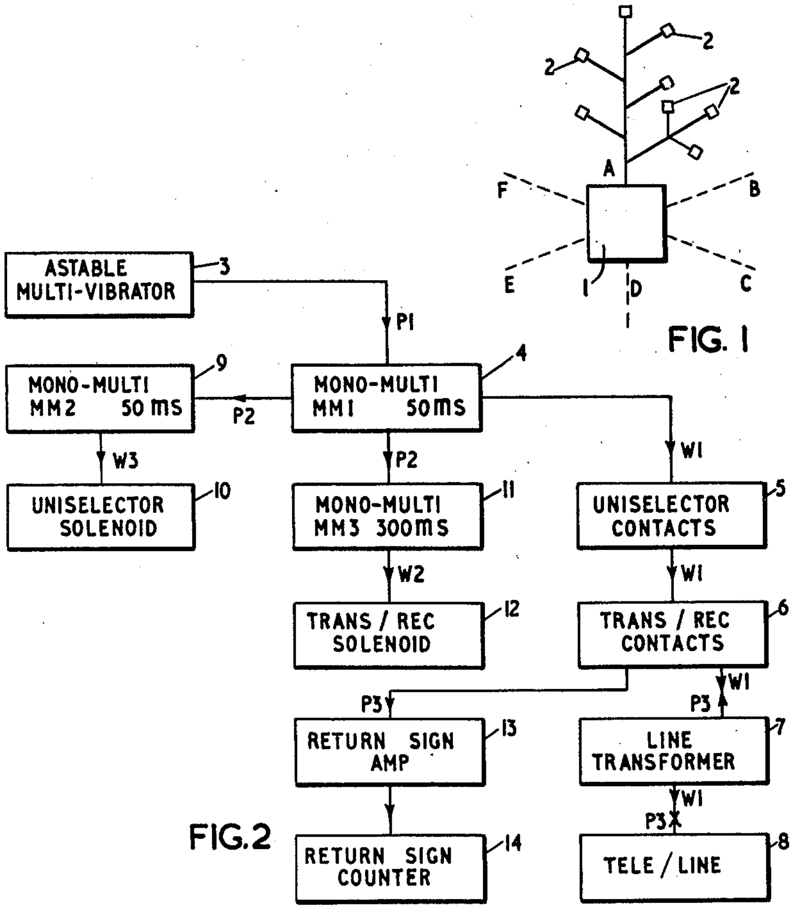
FIGURE 1 is a diagrammatic representation of the layout of a remote indication system to which the present invention refers.
FIGURE 2 is a block schematic of one form of transmitter apparatus for use in the system of FIGURE 1.

In order to facilitate the understanding of the present invention, the system described in my co-pending application Serial No. 823,519 will first be generally described. Referring to FIGURE 1 of the accompanying drawings, the central point or station 1 has apparatus for interrogating each of a plurality of broadcast receivers 2 at remote points over communication paths A, B, C, D, E, F. At each receiver 2 there is a responder unit arranged to respond to interrogation by the central station 1 to transmit back to the central station a signal indicative of the state of its associated broadcast receiver 2. Conveniently, the communication paths are telephone lines but it will be appreciated that they could be lines laid solely for the purposes of the system or the interrogation and response signals could be superimposed on lines provided for other purposes than for telephone communication.

Switching arrangements at station 1 effect sequential interrogation of the paths A–F and the responders at the remote points on each path are arranged to respond in turn to the interrogation signals applied to their associated path. Between each interrogation the apparatus at station 1 is operaive to receive response signals transmitted from the responder last interrogated which signals may for example indicate whether the receiver 2 being interrogated is switched on or not and which one of a plurality of broadcast channels it is tuned to.

For example, the responder devices are arranged in six groups and each group comprises twenty-five responders. The responders are interrogated at intervals of 400 ms. so that a group of twenty-five can be interrogated every ten seconds. The six groups can be interrogated in one minute by one transmitter and receiver device at station 1 connected in sequence to the six groups. Since the groups are separate the interrogation signals can be duplicated in each group thus reducing the number of separately indentifiable interrogation signals required.

From the foregoing it will be seen that one hundred and fifty responders can be interrogated each minute. This enables a rapid check to be made of the conditions of the radio and television receivers associated with the responders and further, the results of the check can be made available immediately by, for example, connecting the receiver device at station 1 to an appropriate indicating means.

Figure 3:
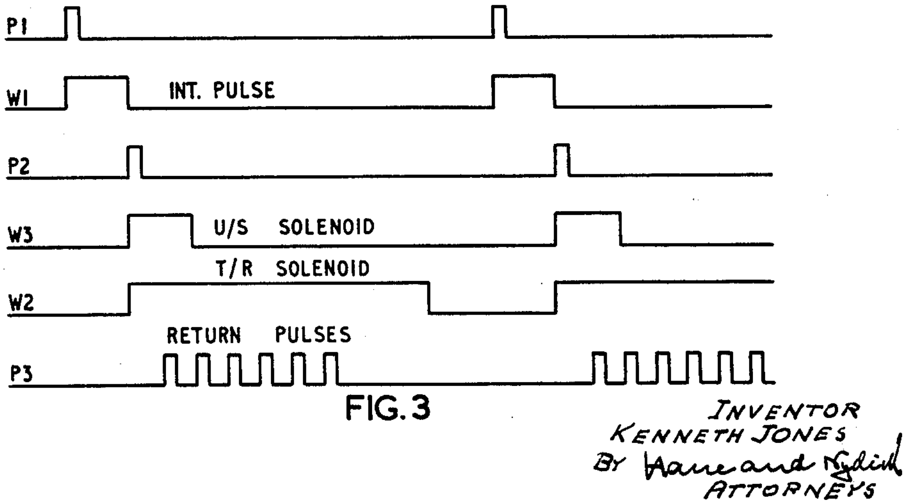
FIGURE 3 is a diagram showing typical waveforms associated with the apparatus of FIGURE 2.

Turning to FIGURE 2, the transmitter and receiver device at station 1 comprises an astable multivibrator 3 which generates timing pulses for example 2 ms. duration say every 400 ms. All the apparatus in the system is, directly or indirectly synchronized from this multivibrator. Thus any error in the timing of the timing pulses merely alters the rate of interrogation and is ineffective otherwise to upset the operation of the system. The timing pulses are the pulses P1 in FIGURE 3.

The timing pulses from the multivibrator 3 in FIGURE 2 are fed to a mono multivibrator 4 which generates the interrogation pulses W1. The leading edges of these pulses are approximately coincident with the leading edges of the timing pulses and have a duration of 10 ms. The interrogation pulses are passed to a uniselector contact 5 from whence they are coupled via transmit/receive relay 6 to a line transformer 7 which passes them to a telephone line indicated at 8.

The mono multivibrator 4 also feeds further synchronizing pulses P2 coincident with the trailing edges of the interrogation pulses, and of 2 ms. duration, to a further mono multivibrator 9 which generates uniselector driving pulses W3 coincident with the leading edges of the further synchronizing pulses. The uniselector driving pulses may be for example of 50 ms. duration and are fed to uniselector 10.

The further synchonizing pulses are also fed to an additional mono multivibrator 11 which is arranged to actuate the solenoid of a transmit/receive relay 12. This solenoid may, for example, be of the slow-to-release type arranged to remain actuated for approximately 300 ms., as indicated at W2 in FIGURE 3, in response to a pulse of approximately 5 ms. duration generated by the multivibrator 11.

In the intervals between the interrogation pulses the apparatus is arranged to be responsive to response pulses P3 from the responders 2. These pulses are amplified by an amplifier 13 and applied to a return signal recorder 14.

The apparatus as so far described does not form part of the present invention per se and therefore will not be further described in detail. However, such detailed descripiton is given in my application Serial No. 823,519.

Figure 4:
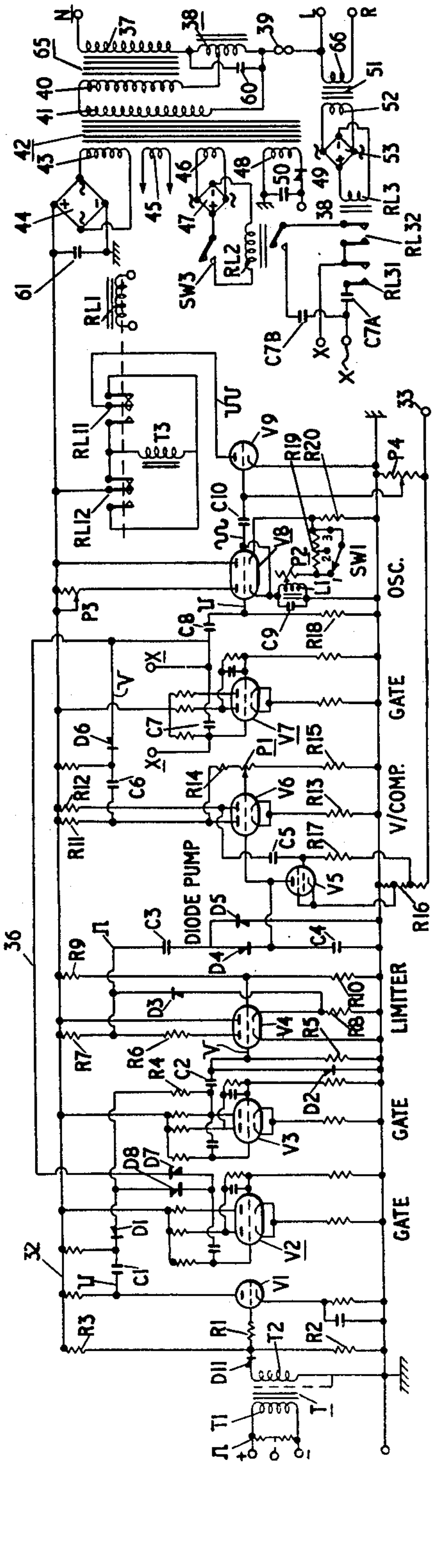
FIGURE 4 is a detailed circuit diagram of a responder according to the present invention.

A circuit diagram of a responder, according to the present invention, associated with a broadcast receiver 2 (FIGURE 1) is shown in FIGURE 4. Referring to this figure positive interrogation pulses W1 (i.e. of 10 ms. duration and at 400 ms. intervals) are received by the responder at the primary winding T1 of a telephone line transformer T. The secondary winding T2 of this transformer is connected between ground and the grid of a limiting amplifier vacuum tube V1, through a diode D11 and a resistor R1. The junction between diode D11 and resistor R1 is connected to ground through a resistor R2 and to the high tension line 32 through a resistor R3. The D.C. bias voltage applied to the grid of vacuum tube V1, which voltage also backs off diode D11, is determined by the ratio of resitsors R2 and R3 and this ratio is chosen such that only interrogation pulses of sufficient amplitude to overcome the bias on diode D11 are applied to the grid of tube V1. If the amplitude of such pulses exceeds a predetermined limit, it is attenuated by grid to cathode conduction in tube V1. The limited amplitude, negative-going pulse appearing at the anode of tube V1 is fed through capacitor C1, diode D1 and resistor R4, connected in series, to the right-hand anode of a double triode vacuum tube V3. This vacuum tube forms part of a monostable multivibrator stage, or gate, in which the left-hand section is conducting when the stage is stable. Arrival of the pulse from tube V1 trips the gate to its unstable condition in which the left-hand side is extinguished and the right-hand side conducts. This effectively blocks the circuit through resistor R4 until just prior to the arrival of the next interrogation pulse and allows the negative going pulse to pass through a differentiating circuit comprising capacitor C2 and resistor R5, the latter being shunted by a diode D2 which removes the positive-going components of the differentiated signal.

The negative component of the differentiated signal is fed to the left-hand grid of a double triode vacuum tube V4 which forms part of a limiting amplifier stage. The left-hand section of this tube is connected, from its cathode, directly to ground and, from its anode, through resistors R6 and R7 to the high tension line 32. The right-hand section of the tube V4 is arranged as a cathode-follower, the anode being connected directly to the high tension line and the cathode being connected through a cathode resistor R8 to ground. Constant D.C. bias potential is applied to the grid of this section from a potentiometer comprising high-stability resistors R9 and R10 connected in series between the high tension line and ground, and the ratio of these resistors is chosen to be such that the voltage applied to the grid is substantially the same as the voltage at the right-hand cathode. The output from the left-hand side of tube V4 is a positive going, rectangular pulse which is taken from the junction between resistors R6 and R7. A diode D3 is connected between this junction and the right hand cathode and the amplitude of the output pulse is limited to a value determined by the backing-off potential applied to diode D3 from resistor R8. This limited amplitude, output pulse is applied through a coupling capacitor C3 to a diode pump circuit comprising diodes D4 and D5 and a high quality capacitor C4.

Each successive interrogation pulse arriving at transformer T causes a corresponding pulse to be fed into the diode pump circuit and charge capacitor C4. The voltage across C4 is applied to the left-hand grid of a double triode tube V6 forming part of a voltage comparator stage. The left-hand anode of tube V6 is connected to the high tension line 32 through a resistor R11 and the right-hand anode is connected to the high tension lines through a resistor R12, both cathodes being connected to ground through a common cathode resistor R13. Resistor R11 forms part of a potentiometer chain, connected between the high tension line and ground, including resistor R14, variable potentiometer P1 and resistor R15. The wiper of potentiometer P1 is connected to the right-hand grid of tube V6 and applies to that grid a predetermined D.C. bias voltage constituting reference voltage for the comparator. The voltage across capacitor C4 increases incrementally as successive pulses are applied to the diode pump circuit, the value of each increment depending in part upon the ratio of capacitors C3 and C4. As has been previously described, each responder is arranged to respond after a given number of interrogation pulses have been received. If, for example, the responder being described is intended to respond to the tenth interrogation pulse received, the wiper of potentiometer P1 is set to provide a reference voltage corresponding to that voltage which will appear across capacitor C4 after the latter has received approximately half the incremental voltage due to the tenth pulse applied to the diode pump circuit. Normally, the left-hand side of tube V6 is non-conducting but, when the voltage applied to the left-hand grid (i.e. the voltage across C4) equals the voltage applied to the right-hand grid, the left-hand side momentarily conducts and the right-hand side is cut off. Capacitor C4 is then discharged so that the left-hand side is cut-off, causing a pulse to appear at the left-hand anode. In order to discharge capacitor C4, a thyratron tube V5 is connected at its anode to the high potential side of C4, the cathode being taken to a tapping on a resistor chain R16 connected between a source of negative D.C. bias voltage 33 and ground. The control grid of tube V5 is held negative with respect to its cathode by a bias voltage applied from a further tapping on resistor chain R16 through a resistor R17. When the right hand side of tube V6 is cut-off, the voltage at the right-hand anode rises sharply and this increased voltage is fed through a coupling capacitor C5 to the control grid of thyratron V5, thereby triggering the thyratron and causing C4 to discharge. Since the cathode of tube V5 is held at a negative voltage (e.g. 15 volts), capacitor C4 is discharged completely in spite of the minimum arc voltage of the thyratron (some 10 or 12 volts).

The negative portion of the output pulse from the left-hand anode of tube V6, corresponding in time to that interrogation pulse to which the responder is to respond, is fed, through a capacitor C6 and a diode D6 to trigger a further monostable multivibrator, or gate, comprising double triode tube V7. This output pulse is also fed, over a line 36, through a diode D7 to trigger a further monostable multivibrator stage, or gate, comprising a double triode tube V2. This causes the latter stage to change from its stable condition, in which the left-hand side is conducting, to its unstable condition in which the right-hand side conducts, thereby applying a backing-off voltage to a diode D8 connected between the junction of diode D1 and resistor R4 and the right-hand anode of tube V2. The effect of diode D8 in this condition is to limit the amplitude of any signals passing through diode D1 so that they are insufficient to trigger tube V3, the voltage at the right-hand anode of tube V2, when conducting, being well below any signal voltage that might appear at the output of diode D1. Tube V2 is arranged to remain in its unstable condition for a period greater than 12 seconds (i.e. the period during which the central transmitter sends interrogation pulses down a given line A, B. etc.). This allows the transmitter to be cleared from the particular line to which the responder under consideration is connected, before the responder next becomes receptive to interrogation signals. It will be noted that output pulses from tube V1, which appear prior to tube V2 being triggered, do not trigger tube V2 due to the polarity of diode D8.

Reverting to the gating circuit comprising tube V7, this also is a monostable multivibrator circuit in which the left-hand side is normally conducting, arrival of a trigger pulse from tube V6 causing the multivibrator to change from its stable state to its unstable state in which the right-hand side conducts. Although not previously described, the operation of a monostable multivibrator circuit being well understood, the time during which the multivibrator remains in its unstable condition may be varied by varying the feedback capacitance, capacitor C7, connected between the right-hand anode and the left-hand grid. As will be hereinafter described, facilities constituting pulse timing means are provided for varying this capacitance through terminals X—X connected across capacitor C7.

A negative-going gating pulse is applied, via coupling capacitor C8 and resistor R18 to the left-hand grid of a double triode tube V8 arranged as a blocking oscillator, the duration of this pulse depending upon the effective value of capacitance at capacitor C7. The left-hand side of tube V8 acts as a clamping stage, the anode being connected to the high tension line through a potentiometer P3 and the cathode being connected to ground through a parallel tuned circuit comprising capacitor C9 and inductance L1. The cathode is connected directly to the right-hand grid of tube V8 and this section acts as a negative resistance amplifier, its anode being connected directly to the high tension line and its cathode being connected to ground through a cathode resistor R20. The cathode voltage is fed to the tuned circuit through a resistor R19 and a potentiometer P2, the wiper of the latter being connected to a tapping on inductance L1. Taps are taken from resistor R19 and connected to contacts of a multi-position switch SW1. This switch may have any number of positions as desired, with corresponding taps. As shown, it has three positions; position 1 shorting the resistor R19, position 2 shorting approximately half of the resistor and position 3 inserting the full resistance between R20 and potentiometer P2. The oscillator circuit described operates as follows: with no signal applied to the left hand grid of tube V8, the left hand section of that tube is conducting and passing a D.C. current through the tuned circuit. Arrival of a negative-going pulse from tube V7 cuts-off the left hand section of tube V8 and a sinusoidal oscillatory voltage appears across the tuned circuit. The amplitude of this oscillation depends upon the value of direct current which was flowing in the tuned circuit and this may be adjusted by varying the setting of potentiometer P3. The sinusoidal oscillations are maintained by virtue of the effective negative resistance connected to the tapping on the inductor L1. With switch SW1 in its position 1, potentiometer P2 is adjusted so that the resistance of the tuned circuit is equivalent to zero damping conditions. Thus, the sinusoidal oscillations are maintained at constant amplitude. The effect of moving switch SW1 to its other positions is to produce initially damped oscillations and this will be described later.

The sinusoidal output of the oscillator is fed, via a capacitor C10, to the grid of a limiting amplifier tube V9. Bias is aplied to this grid from a potentiometer P4 so that the tube is normally biased beyond cut-off. Thus, only negative half cycles of the oscillator output, constituting the responsive pulses, appear at the anode of tube V9. The anode circuit of tube V9 includes contracts RL11 and RL12 of a relay RL1, and a further secondary winding T3 of the input line transformer T. Thus, the output of amplifier V9 is fed through transformer T to the telephone line and then to the central transmitter. With relay RL1 in the condition shown (e.g. not energized), the relay contacts route the output of tube V9 through winding T3 in one direction and, when the relay is in its other condition, the relay contacts are switched over to pass the output signal through winding T3 in the opposite direction. Thus, relay RL1 may be operated to reverse the polarity of response pulses transmitted onto the telephone line.

Switch SW1 of the blocking oscillator may be operated to delay commencement of the responder pulses, relative to the interrogation pulse to which the responder is to respond. If the switch is moved to its position 2, part of resistor R19 is connected to load the tuned circuit so that the oscillator becomes underdamped. Conveniently, switching to position 2 results in the first cycle of the sinusoidal output being of reduced amplitude. Moving the switch position 3, in which the oscillator is further underdamped, is arranged to reduce the amplitude of the first and second pulses. The bias condition of tube V9 is such that the input cycles of reduced amplitude do not appear at the anode. Thus, depending on the position of switch SW1, response pulses may be delayed, in effect, by a time corresponding to the first, or the first and second, response pulse. If desired, additional underdamping may be introduced to produce longer delays or a greater number of delay times.

The power supply section of the responder comprises a mains transformer 65 whose primary winding 37 is connected in series with a choke 38 and a fuse 39, across A.C. supply terminals N and L. Choke 38 is shunted by a capacitor 60 and a tapped section of this choke is connected in series with the secondary winding 40 of transformer 36 and the primary winding 41 of a further transformer 42. Capacitor 60 and choke 38 form a parallel tuned circuit and ensure a constant voltage output in the secondary winding of transformer 42. One of these secondary windings, 43, is connected across a bridge rectifier 44 and the output of this rectifier is connected across a smoothing capacitor 61, between the high tension line 32 and ground. A further secondary winding 45 supplies A.C. voltage to the heaters (not shown) of the various tubes of the responder. A third secondary winding 46 is connected across a bridge rectifier 47 which supplies rectified current to a series circuit comprising a relay solenoid RL2 and a make-and-break switch SW3. A fourth secondary winding 48 provides, via a half wave rectifier 49 and a smoothing capacitor 50, a D.C. negative voltage supply to the bias source.

The broadcast receiver with which the responder is associated is assumed to have a switched mains supply circuit which would normally be connected across terminals L and N. When this receiver is used in conjunction with the responder, however, said mains supply circuit is connected between terminal N and a terminal R, the latter terminal being connected in series with a terminal L through the primary winding 66 of a transformer 51. Thus, when the receiver is switched on, current flows through winding 66. The secondary winding 52 of transformer 51 is connected across a bridge rectifier 53 and the output of this rectifier is connected across the solenoid of a relay RL3. Normally-open contacts RL31 of relay RL3 are connected in series with an auxiliary capacitor C7A across the terminals X—X associated with the circuit of tube V7. Further normally-open contacts RL32 of relay RL3 are also connected, in series with normally-open contacts RL21 of relay RL2 and a further auxiliary capacitor C7B, across the terminals X—X. When the broadcast receiver connected to terminal R is switched off, relay RL3 will be de-energized and both its contacts will be open. Therefore, no extra capacitance will be connected across the terminals X—X in parallel with capacitor C7. The receiver is assumed to have two receive conditions which are of importance. For example, in the case of a television receiver these conditions may be (a) with the receiver switched to one possible program channel and (b) with the receiver switched to a second possible program channel. Switch SW3 is mechanically coupled with the channel selector switch of the receiver so that, in one channel condition switch SW3 is closed, and in the other condition, switch SW3 is open. When the receiver is switched on, the channel selector will be switched to one of the possible channels, for instance that corresponding to the open condition of switch SW3. Relay RL3 will then be energized to close its contacts and capacitor C7A will be connected in parallel with capacitor C7, through closed contacts RL31. Contacts RL32 are also closed but have no effect as contacts RL21 are open. If the channel selector is switched to the other channel, switch SW3 will close, thereby energizing relay RL2 so that contacts RL21 close to connect capacitor C7B in parallel with capacitors C7A and C7.

As has been mentioned previously, if the effective capacitance of capacitor C7 is increased, the time duration of the negative pulses applied to the oscillator tube V8 is increased. This in turn results in a greater number of half-wave sinusoidal oscillations, or responder pulses, appearing at the anode of tube V9. In this way one responder pulse, for example, may be returned to the central station to indicate that the broadcast receiver is switched off: two responder pulses may be returned indicating that the receiver is switched on and tuned to one channel; and three responder pulses may be returned to indicate that the receiver is switched on and tuned to the other channel.

Further information concerning conditions at the broadcast receiver may be conveyed by the response signal returned to the central station, either by adjusting switch SW1 to delay commencement of the response pulses or by operating relay RL1 to reverse the polarity of the response pulses.

Figure 5:
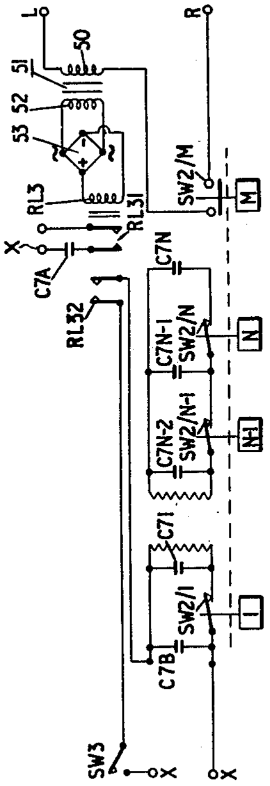
FIGURE 5 is a circuit diagram of a modification of part of the responder shown in FIGURE 4.

FIGURE 5 shows the circuit diagram of a modified arrangement for connecting auxiliary capacitors to the terminals X—X. These parts of the circuit similar to FIGURE 4 are given similar rference numbers. Capacitor C7A remains and is connected to X—X through contacts RL31, as before. Similarly, capacitor C7B is connected to terminals X—X through contacts RL32. However, relay RL2 is dispensed with and switch SW3 is directly in circuit with capacitor C7B. Furthermore, a mains switch SW2/M is inserted between terminal R and transformer primary winding 50, the normal power supply switch (not shown) of the broadcast receiver being short circuited. Switch SW2/M is operated by a push-button M and is mechanically coupled through a latching bar (not shown) with normally closed switches SW2/1 to SW2/N operated by their respective push-buttons 1 to N. This mechanical coupling is such that switch SW2/M is only closed when any one of buttons 1 to N are depressed and, thereafter, when button M is depressed (to open switch SW2/M) switches SW2/1 to SW2/N are set to their closed condition. Any number of the last-mentioned switches can be provided, as indicated by the break lines in the drawing.

Each switch SW2/1 to SW2/N is associated with an auxiliary capacitor C71 to C7N and, in its normally-closed condition, connects its associated capacitor in parallel with capacitor C7B. When any button 1 to N is depressed, the corresponding switch opens to disconnect its associated capacitor, and all capacitors to the right thereof, from capacitor C7B. Thus, if each button 1–N is allocated a particular condition at the broadcast receiver, that condition can be indicated at the central station by depressing the appropriate button, thereby allowing a predetermined number of response pulses to be returned when the responder is interrogated.

It will be noted that to switch on the receiver, it is necessary to depress one of the buttons 1–N. This closes switch SW2/M and causes capacitor C7A to be connected to terminals X—X. If the receiver is switched to the alternative channel, switch SW3 is also closed, connecting capacitor C7B, and those capacitors C71 to C7N remaining in circuit, across terminals X—X in parallel with capacitor C7A. To switch off the receiver, button M must be depressed thereby automatically erasing the condition set up on buttons 1 to N.

I claim:

1. A responder for a condition-indicating system, said responder comprising line terminals, interrogation-signal-receiving means, response-pulse-generating means, condition-responsive means differently responsive to each of a plurality of different conditions to be indicated, first connecting means connecting said line terminals to said interrogation-signal-receiving means for feeding interrogation signals periodically applied to said line terminals to interrogate said responder to said interrogation-signal-receiving means, second connecting means connecting said response-pulse-generating means to said line terminals to apply response pulses generated by said generating means to said line terminals, said interrogation-signal-receiving means being responsive to the reception of a predetermined number of said interrogation signals over said first connecting means to generate a response-initiating signal, third connecting means connecting said interrogation-signal-receiving means to said response-pulse-generating means to apply said response-initiating signal to said response-pulse-generating means to cause said latter means to apply response pulses over said second connecting means to said line terminals, and variable timing means connected to said interrogation-signal-receiving means to receive said response-initiating signal to commence timing a time interval and connected to said condition-responsive means to be selectively controlled, thereby to terminate such time interval after a time determined by the condition to which said condition-responsive means is currently responsive, whereby to time a different time interval for each such different condition and to apply an end-of-timing-period signal to said response-pulse-generating means to terminate the application of said response pulses to said line terminal at the end of such timing period, whereby the number of response pulses applied to said line terminals by said pulse-generating means, in response to the reception of said predetermined number of interrogation signals, is different for each different condition to be indicated and is indicative of the particular condition to which said condition-responsive means is currently responsive.

2. A responder as set forth in claim 1 wherein said pulse generating means comprises a blocking oscillator generating sinusoidal oscillations of constant amplitude, means for selectively introducing a variable resistive component into the oscillatory circuit of said blocking oscillator whereby to reduce the amplitude of one or more initial cycles of oscillation thereof and limiter means to which said oscillations are applied, said limiter means rejecting half-cycles of one polarity of the oscillations applied thereto and suppressing half-cycles of said oscillations of the other polarity which have less than a predetermined amplitude whereby to pass only those pulses of which the amplitude has not been reduced by the resistive component introduced into said oscillatory circuit.

3. A responder as set forth in claim 1 wherein said signal receiving means includes integrating storage means receiving and integrating said interrogation signals into a sum voltage the magnitude of which is related to the number of interrogation signals received, voltage comparison means, means for feeding said sum voltage as one input to said comparison means, a reference voltage source, means for feeding a reference voltage from said source as a second input to said comparison means, said comparison means yielding an output trigger pulse when said first and second inputs bear a predetermined relationship, means responsive to said trigger pulse to apply a control pulse to initiate operation of said pulse generating means.

4. A responder as set forth in claim 1 wherein said variable timing means comprises a monostable multivibrator having a feedback capacitor, and switch means for selectively switching additional capacitance in parallel with said feedback capacitor to vary the duration of the output pulse of said multivibrator.

5. A responder as set forth in claim 1 wherein said signal receiving means includes integrating storage means receiving and integrating said interrogation signals into a sum voltage the magnitude of which is related to the number of interrogation signals received, voltage comparison means, means for feeding said sum voltage as one input to said comparison means, a reference voltage source, means for feeding a reference voltage from said source as a second input to said comparison means, said comparison means yielding an output trigger pulse when said first and second inputs bear a predetermined relationship, a monostable multivibrator constituting said timing means connected to receive said trigger output pulse and to be triggered into a single cycle of oscillation thereby, said multivibrator having a feedback capacitor, switch means for selectively switching additional capacitance in parallel with said feedback capacitor to vary the duration of said single cycle of oscillation and means for applying said single cycle of oscillation to initiate and terminate operation of said pulse generating means.

6. A responder as set forth in claim 1 wherein said variable timing means comprises a monostable electronic switching device including means for selectively varying the switching period thereof and a plurality of relays each being actuated in response to a different condition to be indicated and each acting on said selectively varying means to vary the switching period of said switching device to a predetermined extent.

7. A responder as set forth in claim 1 wherein said variable timing means comprises a monostable multivibrator having a feedback capacitor and switch means for selectively introducing additional capacitance in parallel with said feedback capacitor to extend the duration of the output pulse of said multivibrator by predetermined increments of time, said switch means comprising a plurality of relays energized selectively in accordance with different conditions to be indicated and having contacts for connecting additional capacitors in parallel with said feedback capacitor.

8. In combination a broadcast receiver and a responder as set forth in claim 7 in which combination said broadcast receiver is settable to any one of a plurality of receiving channels or to inoperative state by operation of manual selection means and wherein said relays are energized selectively in dependence upon the setting of said manual selection means, all said plurality of relays being de-energized when said selection means is in a position to set said broadcast receiver to inoperative state so that none of said additional capacitors is connected in parallel with the feedback capacitor of said multivibrator, a first one of said relays being energized when said selection means is in a position to set said broadcast receiver to a first one of said receiving channels so that one of said additional capacitors is connected in parallel with said feedback capacitor, a second one of said relays being energized when said selection means is in a position to set said broadcast receiver to a second one of said channels so that a second of said additional capacitors is connected in parallel with said feedback capacitor and so on.

9. The combination as set forth in claim 8 wherein the output of said multivibrator is connected to response pulse generating means to control the initiation and termination of response pulse generation by said generating means, and the connection of each one of said additional capacitors in parallel with said feedback capacitor extends the duration of the output pulse of said multivibrator sufficiently to allow the generation of one further response pulse by said generating means during the period of said output pulse.

10. The combination as set forth in claim 9 wherein the response pulse output of said generating means is connected to line terminals of said responder, said multivibrator output pulse period in the absence of any additional capacitance in parallel with the feedback capacitor thereof being sufficiently long to allow one response pulse to be applied to said responder line terminals.

11. A responder for a plural condition indicating system, said responder comprising interrogation signal receiver means, response pulse generating means, line terminals for applying interrogation signals received by said responder to said receiver means, and for receiving response pulses generated by said generating means, pulse integrating means in said receiver means for integrating interrogation pulses received by said receiver means to form a sum voltage output the magnitude of which is related to the number of interrogation pulses received, a source of reference voltage, voltage comparison means connected to the output of said integrating means and to the output of said reference source and yielding a trigger pulse output when the magnitude of said sum voltage and said reference voltage bear a predetermined relationship, monostable electronic switching means having a feedback circuit, said switching means receiving said trigger pulse output and switching to an unstable state in response thereto and reverting to a stable state after a time period determined by the amount of capacitance connected in said feedback circuit to yield an output control pulse, switch means responsive to the different conditions to be indicated selectively to vary the amount of capacitance in said feedback circuit by predetermined increments whereby the duration of said output control pulse is indicative of the condition to be indicated, and means for applying said control pulse to said response pulse generating means to control initiation and termination of response pulse generation whereby the number of response pulses applied to said line terminals is indicative of the condition to be indicated.

References Cited by the Examiner

UNITED STATES PATENTS

| | | | |
|---|---|---|---|
| 2,584,739 | 2/52 | Rees | 340—163 |
| 2,944,247 | 7/60 | Breese | 340—163 |
| 2,955,278 | 10/60 | Sibley | 340—163 |
| 3,022,492 | 2/62 | Kleist et al. | 340—151 |
| 3,034,099 | 5/62 | Brixner | 340—163 |
| 3,049,706 | 8/62 | Freedman | 340—151 |

NEIL C. READ, *Primary Examiner.*

EVERETT R. REYNOLDS, IRVING SRAGOW, *Examiners.*